July 5, 1960

E. L. ADAMS ET AL 2,943,349

APPARATUS FOR TRIMMING EXCESS PLASTIC
FROM BLOWN PLASTIC ARTICLES

Filed March 26, 1959

INVENTORS
ELMER L. ADAMS
BY RICHARD C. GASMIRE
J. R. NELSON &
W. A. SCHAICH
ATTORNEYS

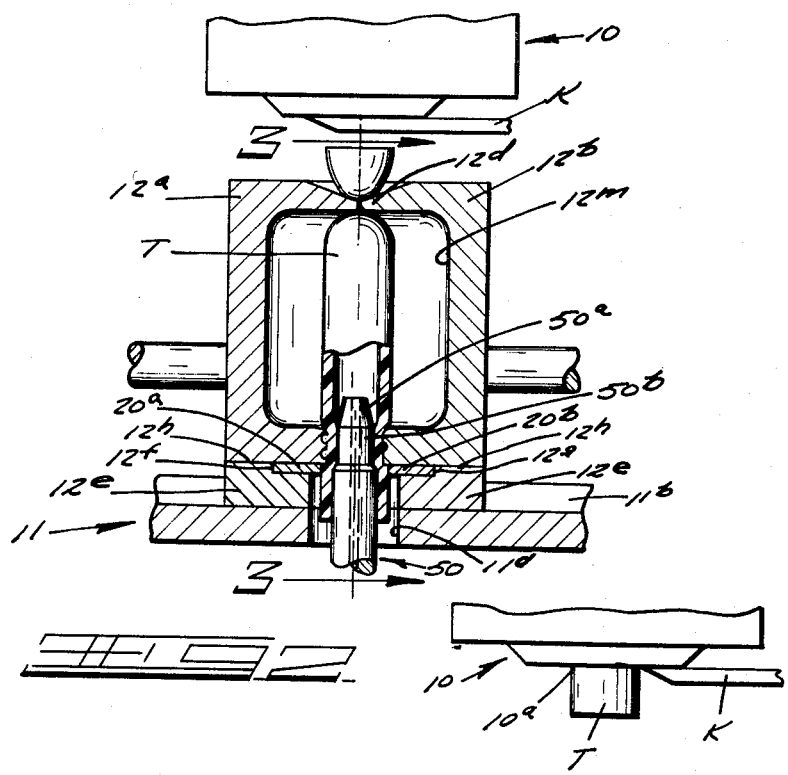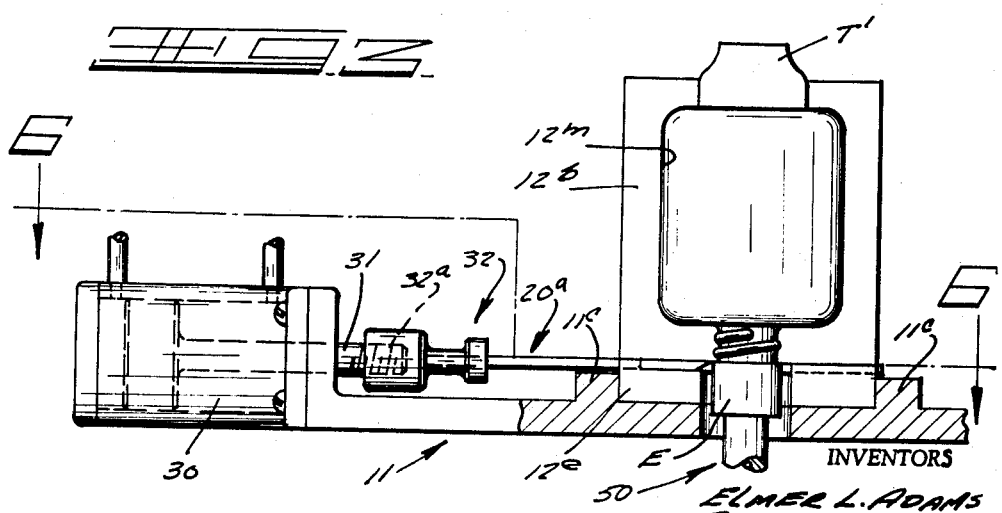

July 5, 1960
E. L. ADAMS ET AL
2,943,349
APPARATUS FOR TRIMMING EXCESS PLASTIC
FROM BLOWN PLASTIC ARTICLES
Filed March 26, 1959
4 Sheets-Sheet 3
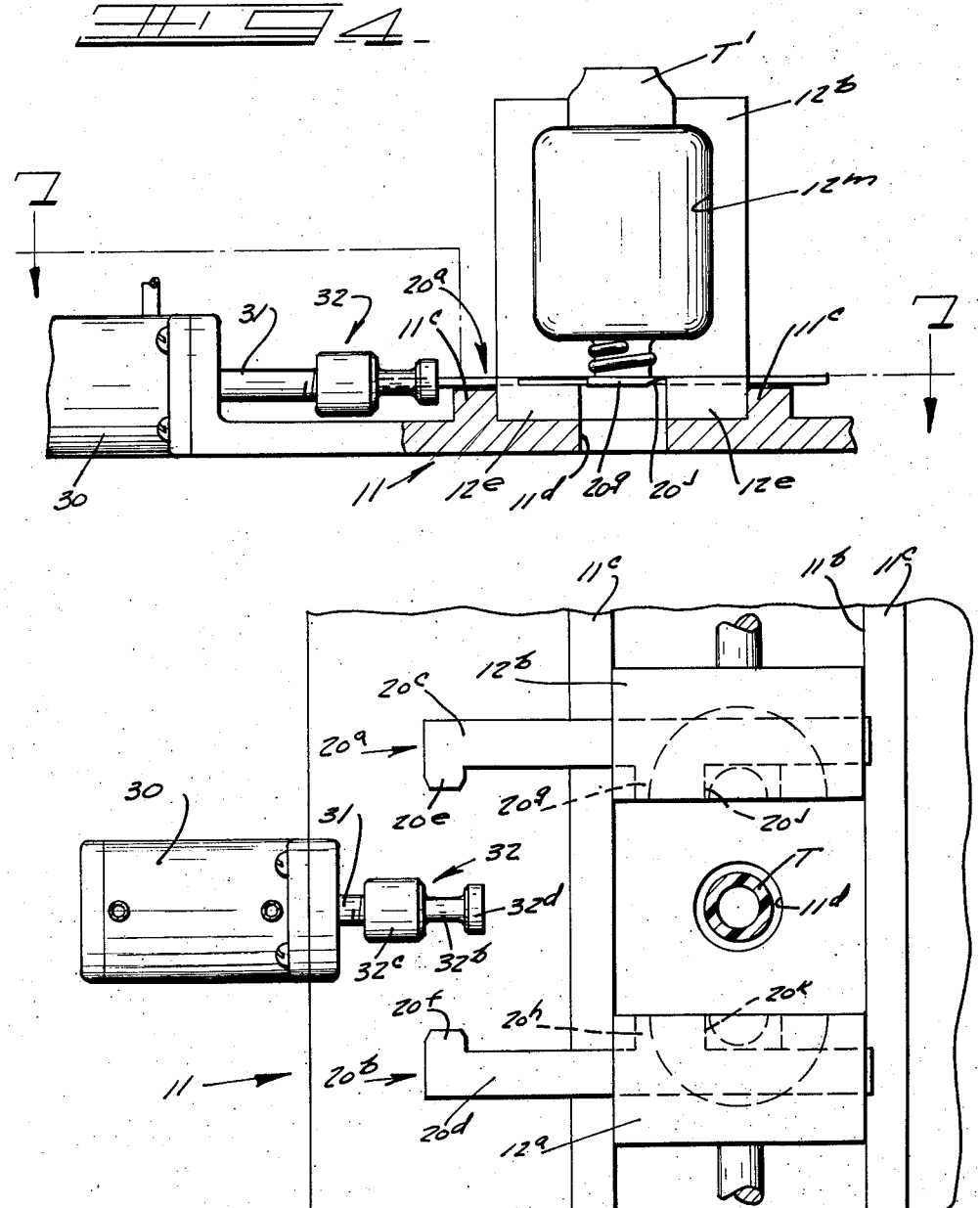
INVENTORS
ELMER L. ADAMS
BY RICHARD C. GASMIRE
J. P. NELSON &
W. A. SCHAICH
ATTORNEYS July 5, 1960
E. L. ADAMS ET AL
2,943,349
APPARATUS FOR TRIMMING EXCESS PLASTIC FROM BLOWN PLASTIC ARTICLES
Filed March 26, 1959
4 Sheets-Sheet 4
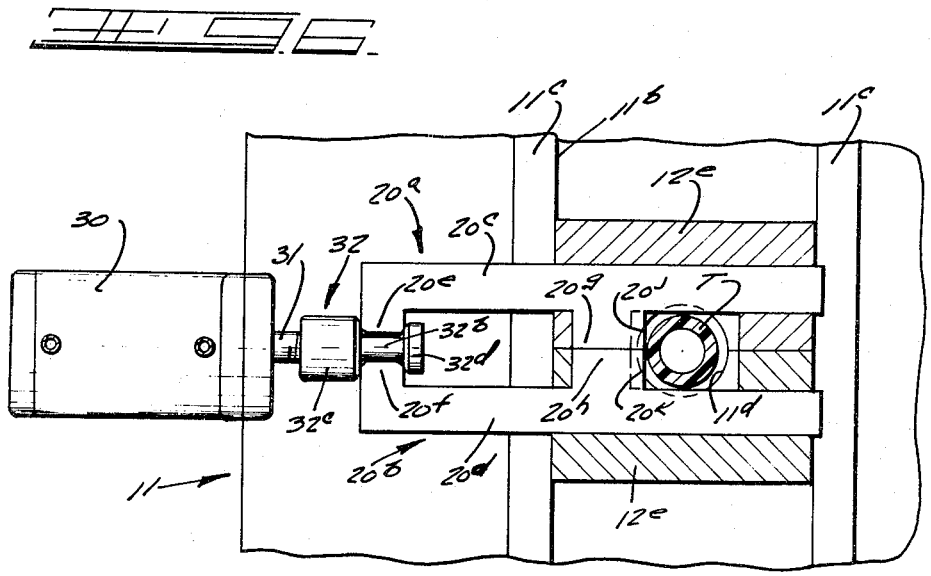
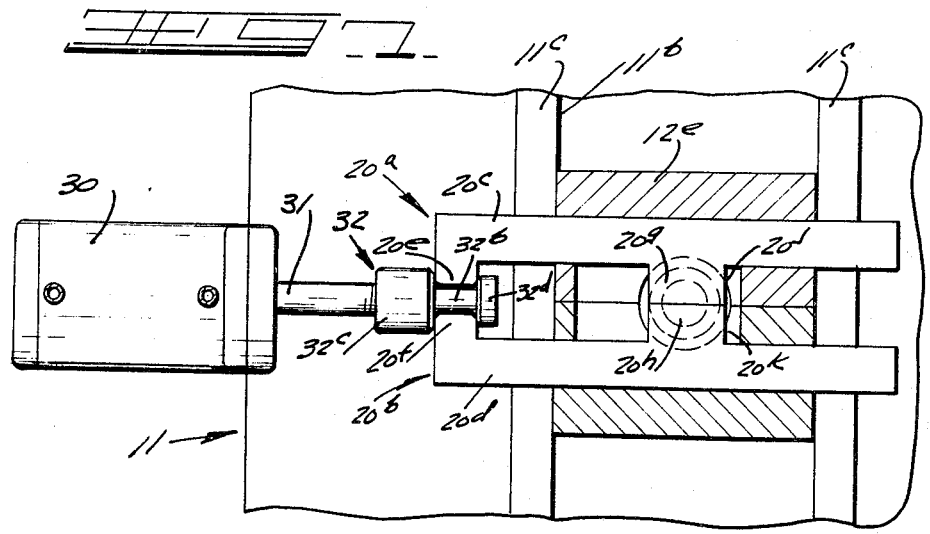
INVENTORS
ELMER L. ADAMS
BY RICHARD C. GASMIRE
J. R. NELSON &
W. A. SCHAICH
ATTORNEYS United States Patent Office 2,943,349
Patented July 5, 1960

2,943,349

APPARATUS FOR TRIMMING EXCESS PLASTIC FROM BLOWN PLASTIC ARTICLES

Elmer L. Adams and Richard C. Gasmire, Toledo, Ohio, assignors to Owens-Illinois Glass Company, a corporation of Ohio Filed Mar. 26, 1959, Ser. No. 802,164

5 Claims. (Cl. 18—5)

This invention relates to an improved apparatus for trimming excess plastic normally formed on hollow plastic articles when such articles are produced by the blowing of heated thermoplastic tubing in a partible mold.

Many machines and processes have heretofore been proposed and utilized for the formation of plastic articles such as toys, dolls, electrical fixtures, containers and the like, by the expansion of a length of heated thermoplastic tubing in a partible mold which is closed around such tubing. In all of such processes, there is invariably produced some excess plastic projecting out of the mold seams which much be trimmed from the resulting article to place it in useful form. In the particular example of the formation of a plastic bottle, excess plastic may be produced on the end of the neck portion of the bottle and, additionally, excess plastic is generally produced on the bottom of the bottle, resulting from the pinching of the plastic tube by the bottom edges of the partible mold sections. In either event, it is highly desirable that such excess plastic be automatically removed from the formed plastic article prior to the removal of the article from the forming machine, otherwise additional handling of the plastic article will be required to remove such excess plastic, thus increasing manufacturing costs.

Accordingly, it is an object of this invention to provide an improved apparatus for automatically trimming plastic articles.

A particular object of this invention is to provide a simple apparatus which can be economically incorporated in an automatic plastic blow-machine for the trimming of blown plastic articles to remove therefrom excess plastic which normally projects out of one or more of the seams or openings of the partible mold.

The specific nature of this invention as well as other objects and advantages thereof will become apparent to those skilled in the art from the following detailed description thereof, taken in conjunction with the annexed sheets of drawings, on which, by way of preferred example only, is illustrated one embodiment of this invention.

On the drawings:

In Fig. 1, the components of the apparatus are shown in their positions corresponding to the start of the machine cycle.

Fig. 2 is an enlarged scale view of a portion of the apparatus of Fig. 1 showing the elements thereof in the next step of the blowing process wherein the partible mold sections are closed around the heated thermoplastic tubing.

Fig. 3 is a sectional view taken on the plane 3—3 of Fig. 2, and illustrating the step of blowing the plastic article.

Fig. 4 is a view similar to Fig. 3 but illustrating the position of the trimming knife immediately after effecting the trimming operation.

Fig. 5 is an enlarged scale partial sectional view taken on the plane 5—5 of Fig. 1.

Fig. 6 is a sectional view taken on the plane 6—6 of Fig. 3.

Fig. 7 is a sectional view taken on the plane 7—7 of Fig. 4.

As shown on the drawings:

Figure 1:
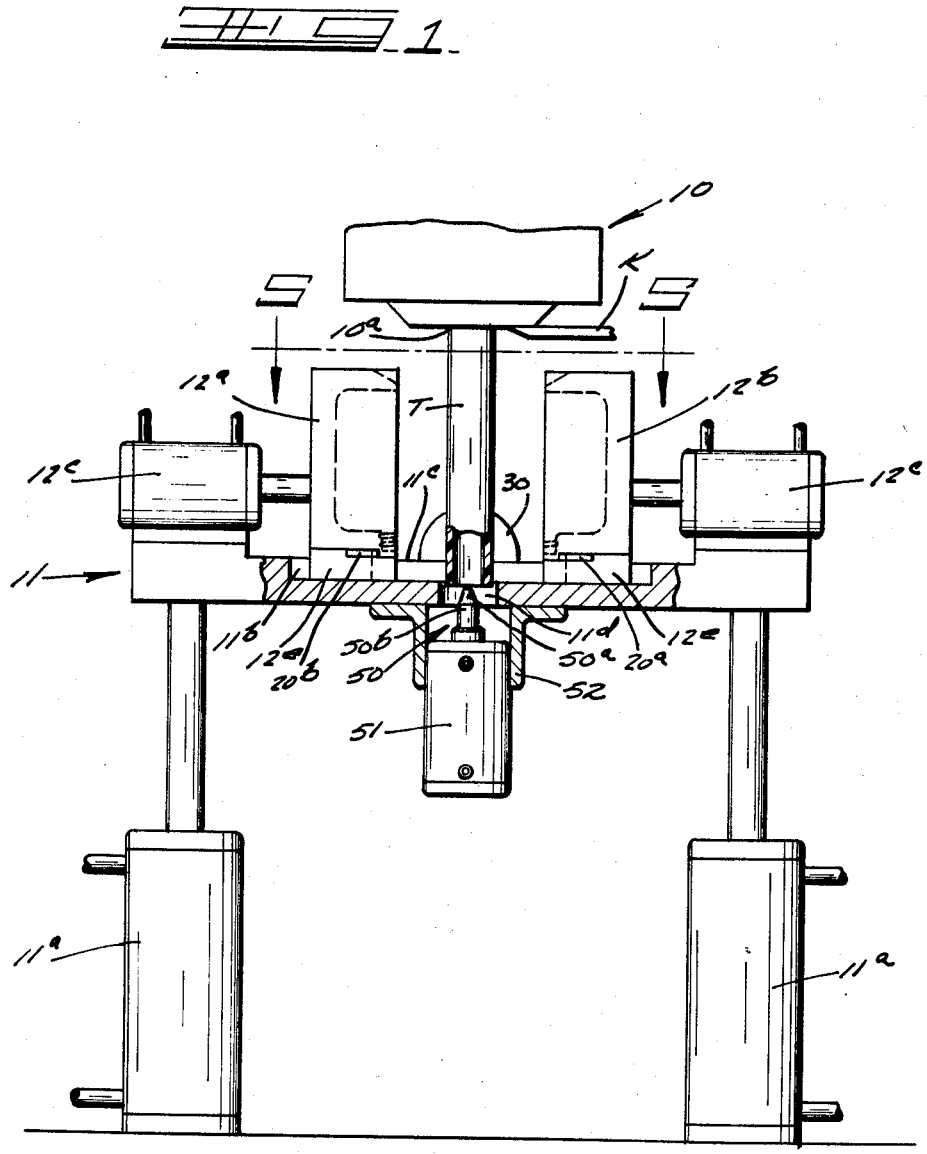
Fig. 1 is a schematic vertical elevational view, partly in section, of a well known form of plastic bottle blowing apparatus to which a trimming device embodying this invention may be readily applied.

While not limited thereto, trimming apparatus embodying this invention may be conveniently applied to a well known form of plastic blowing apparatus which is currently on the market and which is schematically illustrated in Fig. 1. Such apparatus includes an extruder 10 having a downwardly directed annular orifice capable of continually extruding a vertically pendant tube T of heated thermoplastic material. A mold bed 11 is provided beneath the extruder 10 which is capable of vertical movement relative to the extruder orifice. Preferably, mold bed 11 comprises a horizontal plate-like element which is respectively supported at each of its ends by a pair of vertically disposed fluid pressure cylinders 11a, which effect upward and downward movements of the mold bed 11 as required to carry out the plastic blowing process. In the central portion of mold bed 11 an elongated groove or slot 11b is provided and in the center of such groove an aperture 11d (Figs. 2 and 3) is formed which is in axial alignment with the extruder orifice but is of substantially greater diameter than the extruded tube T of thermoplastic material so as to permit the free end of such tube to freely pass therein, even though such tube may curl substantially out of axial alignment with the extrusion axis.

A pair of partible mold sections 12a and 12b are provided which, when closed, define a molding cavity 12m corresponding to the configuration of the plastic article desired. In the particular example illustrated in the drawings, the mold cavity 12m comprises an inverted bottle. Mold sections 12a and 12b are each laterally shiftable with respect to the mold bed 11 and may, if desired, be directly mounted on mold bed 11 for horizontal sliding movement with respect thereto. For example, each mold section 12a and 12b may slide between the upstanding side walls 11c defined by the central slot 11b in the top surface of the mold bed 11. A pair of fluid actuated cylinders 12c are respectively provided on the extreme outer end of mold bed 11 and are suitably connected to mold sections 12a and 12b, respectively, to control the lateral shifting movements of such mold sections relative to the mold bed 11.

A blowpipe 50 is provided in axially concentric relationship with the extruder axis and preferably disposed beneath the mold bed 11. For example, a hydraulic cylinder 51 may be utilized to mount and actuate the blowpipe 50 and such cylinder is secured to the underside of the mold bed 11 by an annular bracket 52. The top portion of the blowpipe 50 is tapered as indicated at 50a to permit the blowpipe to readily enter the bottom open end of the extruded length of tubing of heated plastic tubing T. If desired, the main cylindrical portion 50b of the blowpipe 50 may be constructed to the same diameter as the desired internal diameter of the opening in the article being molded, hence here corresponding to the internal neck diameter of the bottle.

All of the apparatus thus far described has been heretofore known and disclosed. The normal cycle of operation of such apparatus may be clearly apparent from the drawings wherein Fig. 1 illustrates the starting position of the various elements of the apparatus. Thus a desired length of heated thermoplastic tubing T has been extruded by extruder 10 and the bottom open end of such tubing projects downwardly into the mold bed aperture 11b. The mold bed 11 is in its raised position and the mold sections 12a and 12b are respectively in their open position.

In the next step of the normal machine operation illustrated in Fig. 2, the blowpipe 50 is axially elevated by its cylinder 51 to enter the bottom open end of the heated thermoplastic tubing T. Immediately thereafter, the mold sections 12a and 12b are laterally shifted toward each other to their closed positions. The neck portions of the molding cavity 12m cooperate with the inserted cylindrical portion 50b of the blowpipe to compression mold the neck portions of the bottle being produced. Concurrently, the top edges 12d of the mold sections pinch and seal the upper portions of the heated thermoplastic tube.

A tube severing knife K is then passed rapidly through the extruded plastic tube intermediate the mold sections and the extruder orifice 10a to sever the plastic tube and to leave the severed ends open. Immediately after such severing step, or concurrently therewith, the mold bed 11 is lowered to space apart the severed ends of the tubing and to provide adequate clearance to permit the next length of tubing to be extruded by extruder 10 during the blowing and cooling steps which are performed at the lowermost position of the mold bed 11.

As indicated in Fig. 3, pressured fluid is then supplied to the interior of the thermoplastic tubing contained within the mold cavity 12m to expand the tubing to conform to such cavity as indicated in Fig. 3.

In the normal operation of the conventional machine, there will be an excess length of plastic indicated at E in Fig. 3, projecting out of the bottom of the partible mold and secured to the neck portion of the bottle being formed. Heretofore, it has been necessary to manually cut or tear off such excess length of plastic after the opening of the mold sections 12a and 12b and the removal of the formed article therefrom. Likewise, there is customarily formed a piece of excess plastic known as a tail indicated at T' in Fig. 3, projecting out of the top of the partible mold and secured to the bottom portions of the finished plastic article. This tail portion also has customarily been removed by a separate manual operation.

In accordance with this invention, apparatus is provided for automatically effecting severing of excess plastic projecting outwardly from the partible mold. While the apparatus illustrated in the drawings is shown specifically for the removal of the excess plastic E at the bottom of the partible mold, those skilled in the art will understand that a duplicate arrangement could conveniently be provided to remove the excess plastic T' at the top of the partible mold.

In accordance with this invention, each of the mold sections 12a and 12b are respectively provided near their bottom portions with transversely extending horizontal slots 12f and 12g. The slots 12f and 12g may be conveniently defined by bolting a bottom plate 12e to the bottom face of each mold section and providing cooperating recesses in the adjacent surfaces of such bottom plates and bottom faces to produce the slots 12f and 12g. As best shown in Fig. 2, such slots are of rectangular configuration and respectively slidably accommodate knife or shear elements 20a and 20b. As best shown in Figs. 5, 6 and 7, such knife elements each comprise an elongated body portion 20c and 20d which are respectively slidable in the slots 12f and 12g and which project rearwardly, as viewed in Fig. 1, a substantial distance, terminating in inturned lateral projections 20e and 20f, respectively. An upstanding block portion 12h on each bottom plate 12e closes the side of each slot 12f and 12g and confines the knife elements 20a and 20b to longitudinal movements in slots 12f and 12g respectively. Along a medial portion thereof, the knife elements 20a and 20b are respectively provided with inward lateral projections 20g and 20h, the forward lateral edges thereof 20j and 20k being sharpened to form a cutting blade.

In the normal position of the knife elements 20a and 20b, illustrated in Figs. 3 and 5, the knife blade portions 20j and 20k are disposed behind the neck opening in the corresponding mold sections. Hence, forward motion of the knives 20a and 20b, as viewed in Fig. 1, or motion toward the right as viewed in Figs. 3 and 5 will effect a traversing of the knife blade portions 20j and 20k across the neck opening of the mold cavity 12m and thus effect a severance of the excess plastic E projecting out of such mold cavity.

It is, of course, a matter of some difficulty to arrange for actuation of the knives 20a and 20b which are themselves movable with the mold sections 12a and 12b. In accordance with this invention, the actuation of the knives 20a and 20b is conveniently accomplished by a hydraulic cylinder 30 which is fixedly mounted on the rear portions of the mold bed 11, as viewed in Fig. 1, and has its piston shaft 31 radially perpendicular to the extruder axis. On the end of the piston shaft 31, an actuating head 32 is mounted, as by threads 32a. Head 32 has a reduced diameter medial portion 32b disposed between two larger diameter end portions 32c and 32d. The reduced diameter portion 32b receives the inward lateral projections 20e and 20f of the knives 20a and 20b, respectively, when the mold sections 12a and 12b are in their closed positions, as illustrated in Figs. 6 and 7. It will be noted that when the mold sections 12a and 12b are in their closed positions, the knife elements 20a and 20b are disposed in side-by-side relationship and the cutting blade portions 20j and 20k are in alignment. Thus, actuation of the cylinder 30 to the right, as viewed in Fig. 6, will effect the simultaneous traversing of the knife edges 20j and 20k across the neck opening of the mold cavity 12m and effect the severance of the excess plastic portion E.

Actuation of cylinder 30 to the left, as viewed in Fig. 7, will automatically effect the retraction of the knife elements 20a and 20b so that there is no interference with the neck mold opening by such knife elements during any other part of the machine cycle. Of course, when the mold sections 12a and 12b are opened to release the formed plastic article, the knife elements move freely away from the actuating head 32 and assume the positions indicated in Fig. 5.

From the foregoing description, it is apparent that this invention provides an unusually simple and economical apparatus for automatically effecting the severing or trimming of excess plastic projecting out of a partible forming mold. The mounting of the knife sections respectively in the mold sections and the common actuation of such knife sections by the actuating head 32 greatly simplifies the apparatus heretofore required for performing such operation. Furthermore, the knife sections are in engagement with the actuating head 32 only when the mold sections are in their closed position and this engagement and disengagement is accomplished automatically and in a completely foolproof manner.

It will, of course, be understood that various details of construction may be modified through a wide range without departing from the principles of this invention, and it is, therefore, not the purpose to limit the patent granted hereon otherwise than necessitated by the scope of the appended claims.

We claim:

1. Apparatus for trimming excess thermoplastic projecting out of an aperture of a molding cavity defined by a partible mold having two mold sections relatively movable between open and closed positions, comprising a pair of shears having cutting edges, means for respectively slidably mounting said shears in said mold sections so that said shears are in juxtaposition and said cutting edges aligned when said partible mold is closed, the path of movement of said aligned cutting edges traversing said aperture, a reciprocable actuator and means for connecting both of said shears to said reciprocable actuator for concurrent actuation thereby only when said mold sections are in substantially closed position.

2. In a plastic blow molding machine having a partible blow mold comprising two mold sections relatively movable between open and closed positions with respect to a length of moldable thermoplastic tubing, a portion of such tubing projecting outwardly between said mold sections when closed, the improvement comprising a pair of knives, means for slidably mounting said knives respectively on said mold sections so that the cutting edges of said knives traverse said projecting portion of the tubing, a motor having a reciprocable actuator, and means for automatically connecting both of said knives to said reciprocable actuator for concurrent actuation thereby only when said mold sections are in said closed position, said last mentioned means being automatically disconnected by movement of said two mold sections to said open position.

3. The combination defined in claim 2, wherein said last mentioned means comprises an enlarged head on said reciprocable actuator movable by said motor along a path transverse to the path of movement of said mold sections, each of said knives having a body portion projecting out of the respective mold section in the direction of said enlarged head, and a notch in each knife body portion arranged to snugly surround said enlarged head when said mold sections are closed.

4. In a plastic blow molding machine having a partible blow mold comprising two mold sections relatively movable between open and closed positions with respect to a length of moldable thermoplastic tubing, a portion of such tubing projecting outwardly through a seam defined by said mold sections when closed, the improvement comprising a knife, means for slidably mounting said knife on one of said mold sections so that the cutting edge thereof moves along said mold seam to sever said projecting portion of the tubing, a motor having a reciprocable actuator movable in a path parallel to said mold seam and transverse to the path of movement of said one mold section, and means connecting said knife and said actuator only when said one mold section is in its closed position, said last mentioned means being automatically disconnected by movement of said one mold section to its said open position.

5. The combination defined in claim 4, wherein said last mentioned means comprises an enlarged head on said reciprocable motor movable by said motor along a path transverse to the path of movement of said mold sections, said knife having a body portion projecting out of the respective mold section in the direction of said enlarged head, and a notch in said knife body portion arranged to snugly surround said enlarged head when said mold sections are closed.

References Cited in the file of this patent
UNITED STATES PATENTS 2,810,934    Bailey _____ Oct. 29, 1957

FOREIGN PATENTS 1,104,304    France _____ June 8, 1955